W. McGUIRE.
Gate.
No. 81,521.            Patented Aug. 25, 1868.
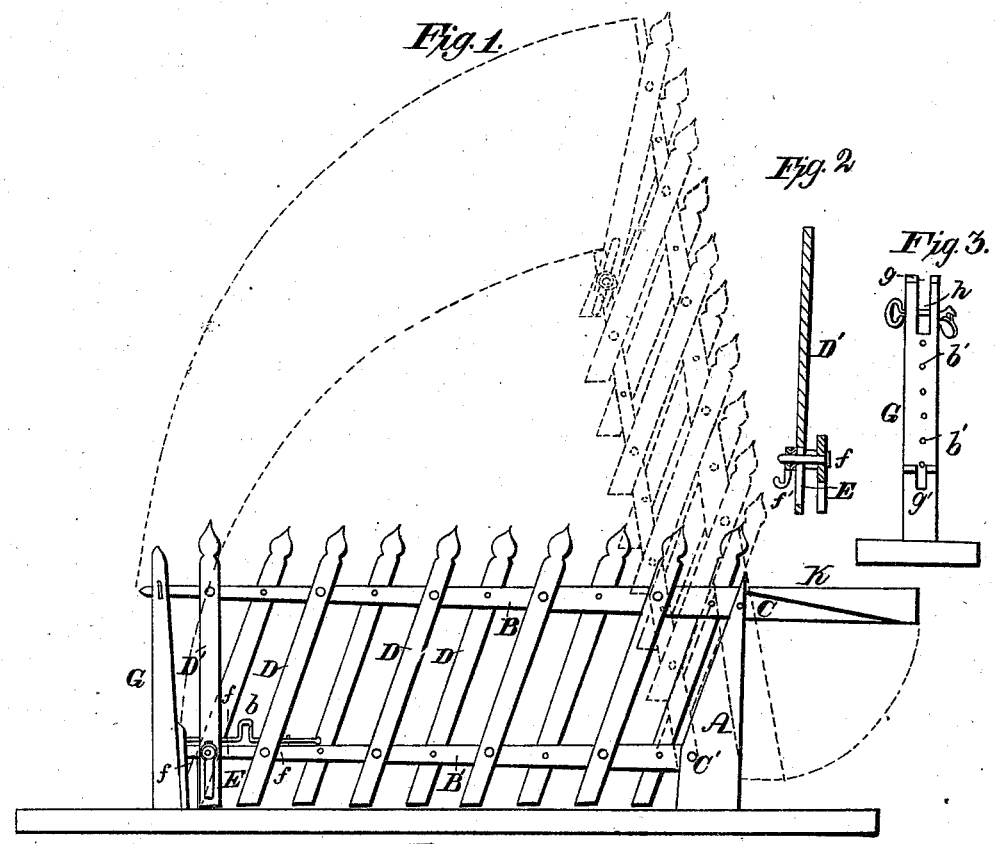
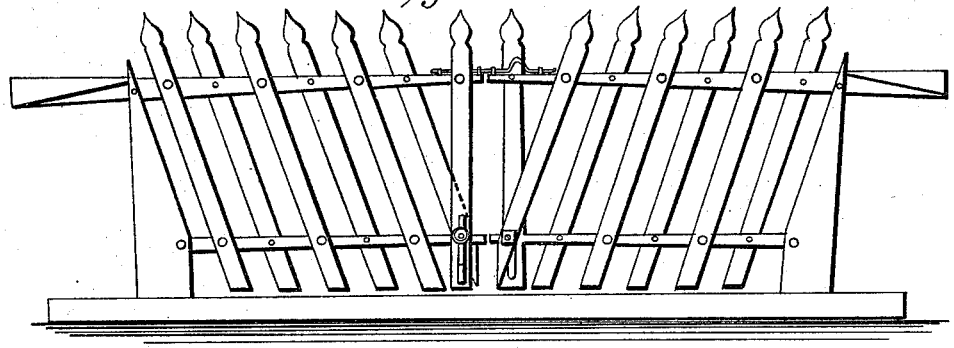
Witnesses:        Inventor:
              William McGuire
per Attorney T. A. Connolly

United States Patent Office.

WILLIAM McGUIRE, OF CHESS SPRINGS, PENNSYLVANIA.

Letters Patent No. 81,521, dated August 25, 1868.

IMPROVEMENT IN FARM GATES.

*The Schedule referred to in these Letters Patent and making part of the same.*

TO ALL WHOM IT MAY CONCERN:

Be it known that I, WILLIAM McGUIRE, of Chess Springs, in the county of Cambria, and State of Pennsylvania, have invented certain new and useful Improvements in Farm-Gates; and I do hereby declare the following to be a full, clear, and exact description thereof, reference being had to the accompanying drawings making a part of this specification, in which—

Figure 1 represents a side elevation of a single gate.
Figure 2 is a section through first paling, marked D', fig. 1.
Figure 3 is a face view of front post marked G.
Figure 4 is a side elevation of a double-tip gate
Figure 5 is a sectional view of main post A.

The nature of my invention has reference to that class of tip or weight-gates having a parallel movement of the horizontal bars, and consists in such a construction and arrangement of the different parts as will allow the gate to stand perpendicular, or nearly so, when fully opened; and also in the application of a device by which the gate may be made to rest rigidly at any desired height from the ground, for the purpose of allowing small cattle to pass through, &c.

In the drawings, A represents the main post of the gate, provided with a suitable slot, A', for the working of the gate, and within which the horizontal bars B B' are pivoted by the bolts C C' passing through the post A.

D are the palings of the gate, pivoted obliquely to the bars B B', and alternating as shown. D' shows a perpendicular paling pivoted to the upper horizontal bar B, and provided with a vertical slot, E, at its lower end, working on the extended pivot $f$ of the first oblique paling. The said pivot terminating in a screw, holds a nut, $f'$, by turning which, the movement of the perpendicular paling is prevented, and also the other palings, and the gate kept from moving upwards or downwards from any desired position.

G is the front post of the gate, to which it is locked when closed, being provided with suitable slots $g\ g'$ for the reception of the horizontal bars B B', and a bolt, $h$, or equivalent, to which a padlock may be attached. $b$ is a sliding latch, fitting in the holes $b'$ of the post G.

It will be perceived that the main post A is placed in the ground or sill, in a slightly-inclined position, in order to allow the gate to be tipped as high as may be necessary, the weight K being made in the triangular form shown, so as to fit closely and evenly against the back of the post A.

The front of the post A is cut or shaped obliquely, so as to be parallel with the palings D, allowing the end paling to rest thereon when the gate is fully opened.

What I claim as my invention, and desire to secure by Letters Patent, is—

The paling D', provided with the slot E, in combination with the bolt or pivot $f$ and nut $f'$, substantially as and for the purpose herein specified.

WILLIAM McGUIRE.

Witnesses:
  ASAHEL BROOKS,
  M. D. WAGNER.